(12) United States Patent  
Bard et al.

(10) Patent No.: US 10,550,031 B2
(45) Date of Patent: Feb. 4, 2020

(54) GLASS WINDOW HAVING A LUMINOUS CAPABILITY

(71) Applicant: CENTRAL GLASS COMPANY, LIMITED, Yamaguchi (JP)

(72) Inventors: Michael Bard, Primm Springs, TN (US); Tobias Solchenbach, Trier (DE); Yoshihiko Obara, Matsusaka (JP); Nobuyuki Nakai, Matsusaka (JP)

(73) Assignee: Central Glass Company, Limited (JP)

( * ) Notice: Subject to any disclaimer, the term of this patent is extended or adjusted under 35 U.S.C. 154(b) by 0 days.

(21) Appl. No.: 16/082,482

(22) PCT Filed: Feb. 23, 2017

(86) PCT No.: PCT/JP2017/006695
§ 371 (c)(1),
(2) Date: Sep. 5, 2018

(87) PCT Pub. No.: WO2017/154583
PCT Pub. Date: Sep. 14, 2017

(65) Prior Publication Data
US 2019/0218139 A1   Jul. 18, 2019

Related U.S. Application Data

(60) Provisional application No. 62/305,118, filed on Mar. 8, 2016, provisional application No. 62/414,192, filed on Oct. 28, 2016.

(51) Int. Cl.
| | |
|---|---|
| C03C 17/00 | (2006.01) |
| B32B 17/10 | (2006.01) |
| B32B 37/18 | (2006.01) |
| B32B 17/06 | (2006.01) |
| F21V 8/00 | (2006.01) |
| C03C 3/04 | (2006.01) |
| B60J 1/00 | (2006.01) |

(52) U.S. Cl.
CPC ............ *C03C 17/007* (2013.01); *B32B 17/06* (2013.01); *B32B 17/10036* (2013.01);
(Continued)

(58) Field of Classification Search
CPC ..... C03C 17/007; C03C 17/008; C03C 17/04; B32B 17/00541; B32B 17/06;
(Continued)

(56) References Cited

U.S. PATENT DOCUMENTS 8,216,670 B2   7/2012   Kumon et al.
8,246,848 B2   8/2012   Saito et al.
(Continued)

FOREIGN PATENT DOCUMENTS

| CA | 2969026 A1 | 6/2016 |
|---|---|---|
| DE | 202016008092 U1 | 3/2017 |

(Continued)

OTHER PUBLICATIONS

European Patent Office. Extended European Search dated Aug. 18, 2018. European Patent Application No. 18163070.8-1204. Name of Applicant: Central Glass Co., Ltd. English Language. 10 pages.
(Continued)

*Primary Examiner* — Thomas M Sember
(74) *Attorney, Agent, or Firm* — Bass, Berry & Sims, PLC (57) ABSTRACT

Disclosed is a glass window having a luminous capability, which is suitable for use in automotive applications, architectural applications, or other applications. Exemplary embodiments of a glass window having a luminous capability include one or more glass sheet layers, a thin film layer having fine particles dispersed in a matrix of a thin film material, and at least one light source for introducing light into the thin film layer. The fine particles scatter the light and generate luminousness of the glass window. Exemplary embodiments of a glass window having luminous capability may further include one or more resinous sheet layers or one or more interlayers such as a plastic film layer.

12 Claims, 10 Drawing Sheets

Schematic diagram of first embodiment as luminous glass (52) U.S. Cl.
CPC .. *B32B 17/10541* (2013.01); *B32B 17/10935* (2013.01); *B32B 37/18* (2013.01); *B32B 37/182* (2013.01); *C03C 3/04* (2013.01); *C03C 17/008* (2013.01); *G02B 6/0041* (2013.01); *G02B 6/0058* (2013.01); *G02B 6/0065* (2013.01); *G02B 6/0095* (2013.01); *B32B 2255/20* (2013.01); *B32B 2264/102* (2013.01); *B32B 2307/4026* (2013.01); *B32B 2307/414* (2013.01); *B32B 2315/08* (2013.01); *B32B 2605/006* (2013.01); *B60J 1/00* (2013.01); *C03C 2217/452* (2013.01); *C03C 2217/476* (2013.01); *C03C 2217/48* (2013.01); *C03C 2217/485* (2013.01); *C03C 2218/113* (2013.01)

(58) Field of Classification Search
CPC ........ B32B 17/10036; B32B 17/10935; B32B 37/18; B32B 37/182; G02B 6/0041; G02B 6/0058; G02B 6/0065; G02B 6/0095
See application file for complete search history.

(56) References Cited

U.S. PATENT DOCUMENTS

| | | | |
|---|---|---|---|
| 8,299,169 | B2 | 10/2012 | Saito et al. |
| 2007/0098969 | A1 | 5/2007 | Ansems et al. |
| 2010/0143600 | A1 | 6/2010 | Saito et al. |
| 2010/0227159 | A1 | 9/2010 | Kumon et al. |
| 2015/0030778 | A1 | 1/2015 | Kuwahara et al. |
| 2015/0264800 | A1 | 9/2015 | Schmalbuch et al. |
| 2015/0298601 | A1 | 10/2015 | Bott et al. |
| 2016/0349442 | A1* | 12/2016 | Berard ............. B32B 17/10018 |

FOREIGN PATENT DOCUMENTS

| | | |
|---|---|---|
| EP | 2219056 A1 | 8/2010 |
| EP | 2683033 A1 | 1/2014 |
| JP | 2011215568 A | 10/2011 |
| JP | 2015034281 A | 2/2015 |
| WO | 2010097110 A1 | 9/2010 |
| WO | 2012059126 A1 | 5/2012 |
| WO | 2015118279 A1 | 8/2015 |
| WO | 2016096248 A1 | 6/2016 |

OTHER PUBLICATIONS

European Patent Office. PCT International Search Report dated May 9, 2017. International Patent Application No. PCT/JP2017/006695. International Filing Date: Feb. 23, 2017. English Language. 4 pages.
European Patent Office. PCT Written Opinion of the International Searching Authority dated May 9, 2017. International Patent Application No. PCT/JP2017/006695. International Filing Date: Feb. 23, 2017. English Language. 6 pages.

* cited by examiner

Main section of first embodiment as luminous glass, the main section corresponding to A-A' cross-section of figure 2

Cross-sectional and schematic diagram of apparatus for evaluation of luminous state of sample

GLASS WINDOW HAVING A LUMINOUS CAPABILITY

CROSS REFERENCE TO RELATED APPLICATIONS

This application is a U.S. National Phase Patent Application of International Patent Application No. PCT/JP2017/006695 filed on Feb. 23, 2017 which claims the benefit of U.S. Provisional Patent Application No. 62/305,118 filed on Mar. 8, 2016 and U.S. Provisional Patent Application No. 62/414,192 filed on Oct. 28, 2016, the entire contents of both applications is hereby incorporated by reference.

FIELD OF DISCLOSURE

This disclosure generally relates to a glass window having a luminous capability.

BACKGROUND OF THE INVENTION

Automotive glass windows having a luminous capability are known in the art such as described in EP Patent Pub. Nos. 2401639 and 2219056 and U.S. Patent Pub. Nos. 2015/0298601 and 2007/0098969. At least some conventional glass windows have a light source(s) positioned at one or more edge portions of the glass, and visible light from the light sources is introduced into the glass window to generate luminance at a main surface of the glass window. The luminance is achieved by visible light scattering at particles such as indium tin oxide and/or titanium oxide in a glass lamination. Some art describes the particles as dissolved either in a polymeric matrix or in a screen print paint. For example, EP Patent Pub. No. 2219056 and WO Patent Pub. No. 2010/097110.

BRIEF SUMMARY OF THE EXEMPLARY EMBODIMENTS

The disclosed exemplary embodiments are generally directed to glass windows having a luminous capability for architectural and automotive applications, such as automotive sunroofs.

According to one exemplary embodiment, a glass window having a luminous capability comprises: at least one glass sheet layer; at least one thin film layer having fine particles dispersed in a matrix of a thin film material; and, at least one light source positioned at an edge portion of the thin film layer and/or the glass sheet layer, wherein the thin film layer covers at least a portion of a main surface of the glass sheet layer and the fine particles have a higher refractive index than the matrix that scatters visible light from the light source.

In the same or different embodiments, a glass window having luminous capability may comprise at least two glass sheet layers, one or more interlayers, and/or a light source positioned between the glass sheet layers and/or other interlayers as may be used.

According to another exemplary embodiment, a glass window having a luminous capability comprises: at least one glass sheet layer; at least one resinous sheet layer; at least one interlayer; at least one thin film layer having fine particles dispersed in a matrix of a thin film material; and, at least one light source positioned at an edge portion of at least one of the thin film layer, the resinous sheet layer, and the glass sheet layer, wherein the thin film layer covers at least a portion of a main surface of the resinous sheet layer and the fine particles have a higher refractive index than the matrix that scatters visible light from the light source. In embodiments comprising more than one glass sheet layer and/or interlayer, at least one light source may additionally be positioned between glass sheet layers and/or interlayers.

The disclosed exemplary embodiments of a glass window having a luminous capability, in a luminous state, have luminousness at peripheral portions of the thin film and a light intensity that fades out in a direction from edge portions of the glass window towards the center of the glass window. Further, the exemplary glass windows, in a non-luminous state, have a haze that is below approximately 10% as measured by International Organization for Standardization ("ISO") Standard 14782:1999 titled Plastics—Determination of haze for transparent materials.

The scope of this disclosure should not be limited to the exemplary embodiments or the details of construction or the arrangement of components set forth in the written description or drawings. Those of ordinary skill in the art will understand that the exemplary embodiments may be practiced using other components, materials, structures, or designs consistent with this disclosure. In addition, the language and terminology of this disclosure, including the Abstract of the disclosure, is representative and is provided for purposes of this disclosure and should not be considered limiting.

BRIEF DESCRIPTION OF DRAWINGS

The features and advantages of the exemplary embodiments may be better and more completely understood with reference to the attached drawings in which corresponding reference symbols indicate corresponding parts, and in which.

DETAILED DESCRIPTION OF THE EXEMPLARY EMBODIMENTS

The exemplary embodiments are described with respect to the attached drawings, although the disclosure is not limited thereto. Further, the drawings may not be drawn to scale, to better illustrate the disclosed embodiments.

Figure 1:
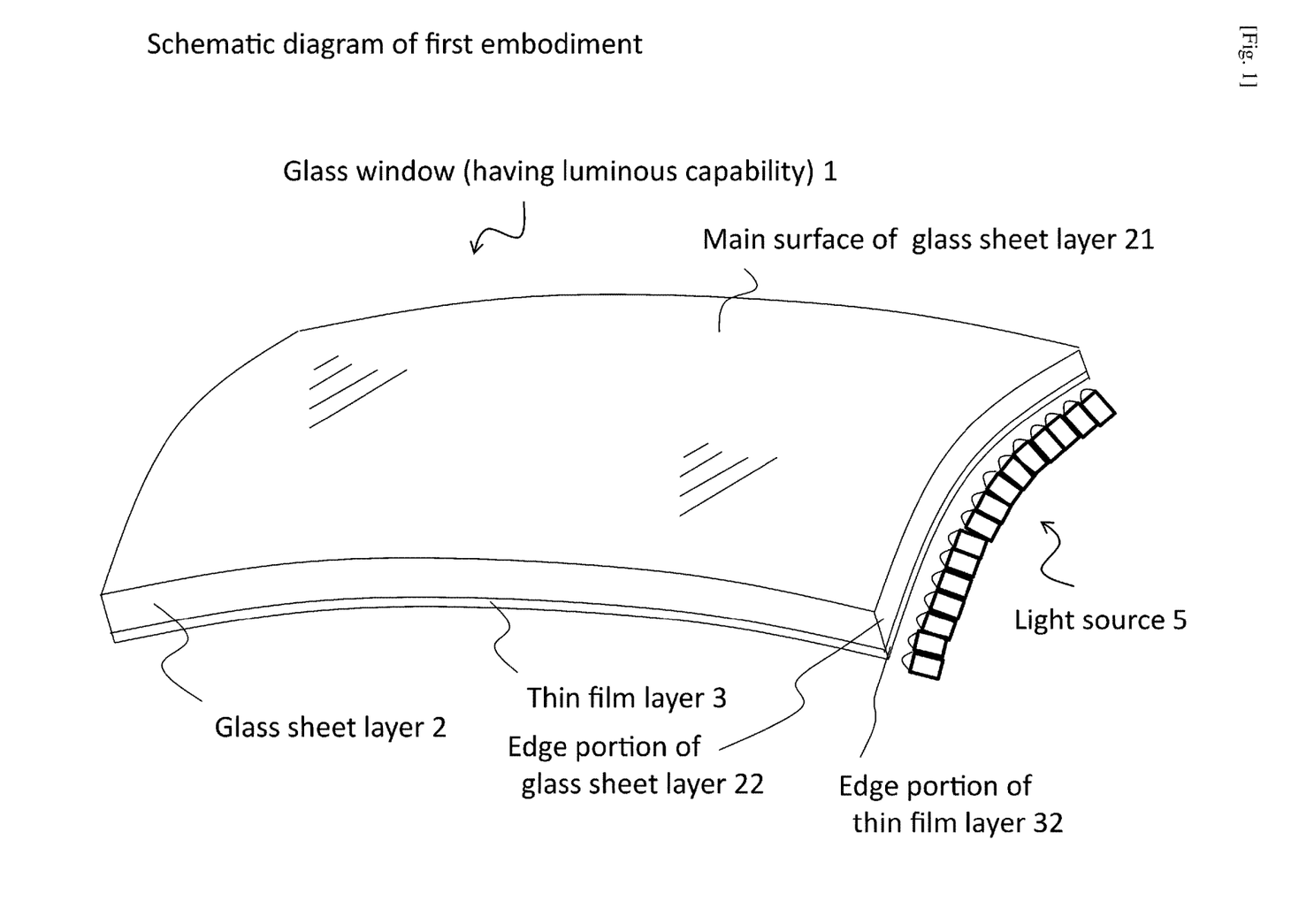
FIG. 1 shows a schematic diagram of a first embodiment of a glass window having a luminous capability.

FIG. 1 shows a schematic diagram of a first exemplary embodiment of a glass window 1 having a luminous capability. Glass window 1 may be a laminated glass window or a single-sheet glass window. As shown in FIG. 1, glass window 1 comprises a glass sheet layer 2, a thin film layer 3, and at least one light source 5 positioned at an edge portion 32 of the thin film layer 3 and/or at an edge portion 22 of the glass sheet layer 2.

Glass sheet layer 2 may be a flat glass or a curved glass. A curved glass is generally preferable for automotive use. The curved glass can be manufactured from a flat glass sheet using known methods for forming curved automotive glass. Glass sheet layer 2 may be formed from, for example, a safety glass such as a tempered glass. In an exemplary embodiment, glass sheet layer 2 is an inorganic glass sheet with high or low transparency, such as soda-lime glass produced by the float process or the roll-out process commonly employed in producing glass substrates for automobiles or architectural applications. Glass sheet layer 2 may be either colorless (for example clear glass) or colored (for example green tint glass or privacy glass) and may be combined with other functional films (for example acoustic interlayers). Further, glass sheet layer 2 may be in any of various forms, such as a panorama sunroof for automobiles.

Figure 2:
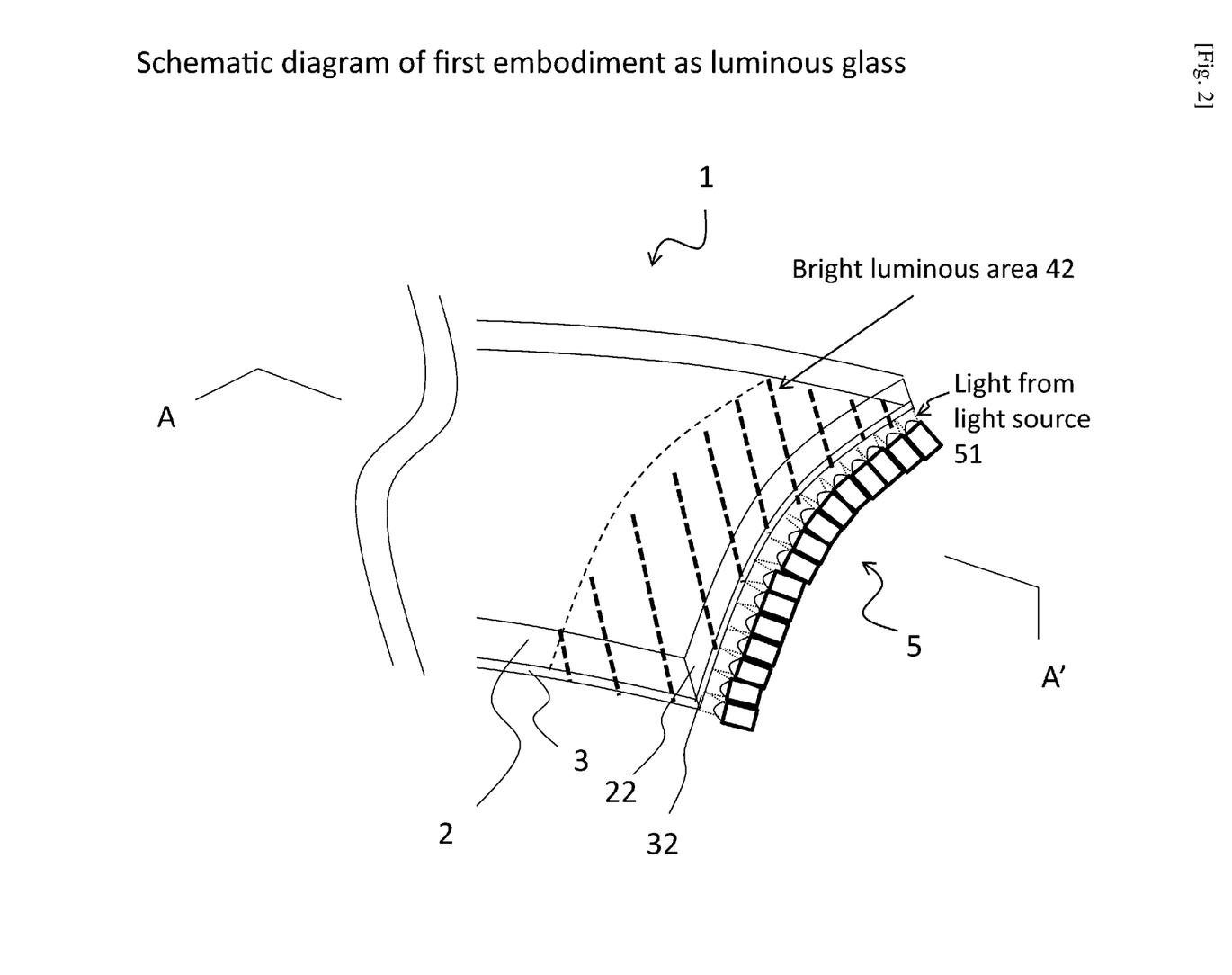
FIG. 2 shows a schematic diagram of the first embodiment as luminous glass.
Figure 3:
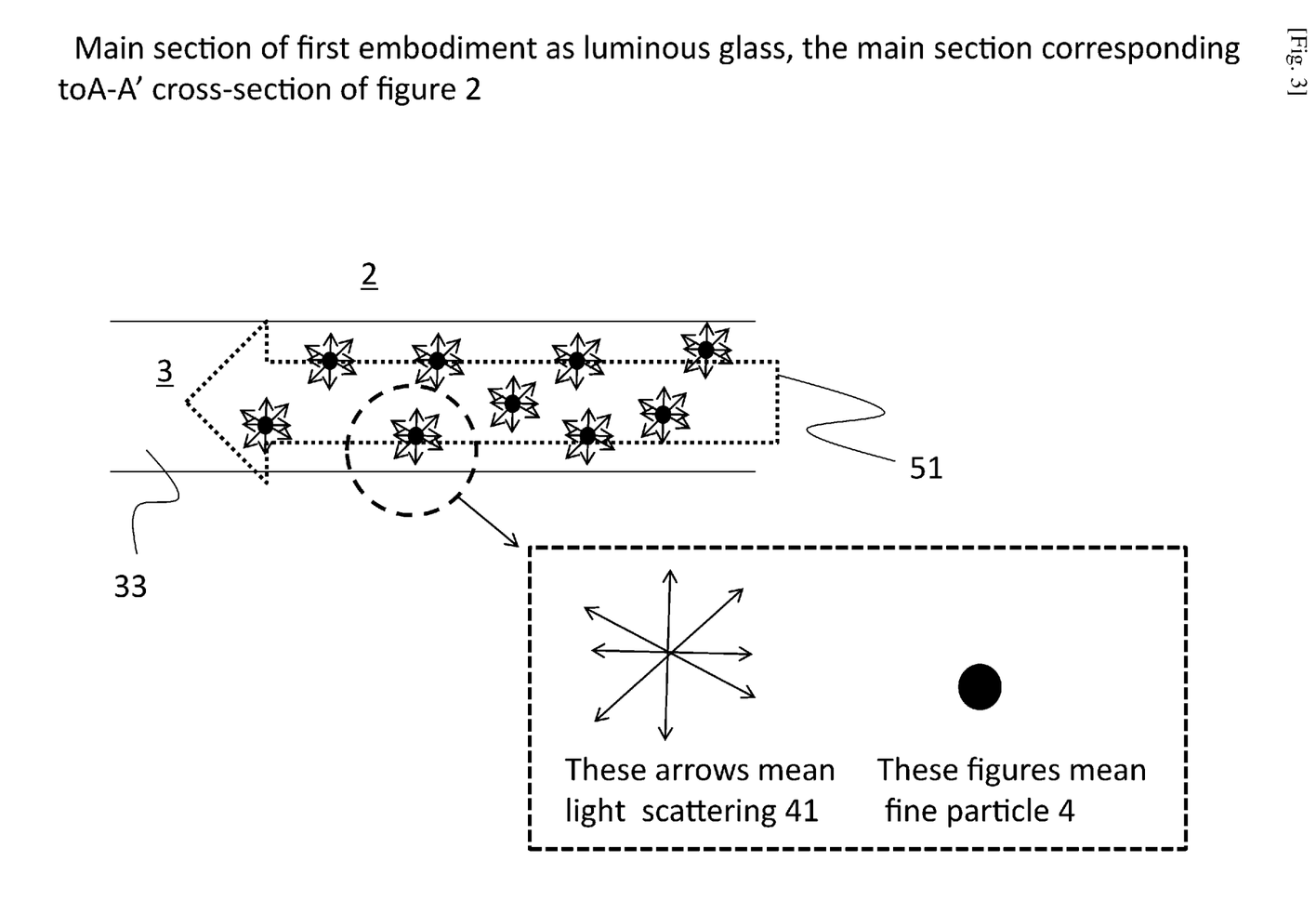
FIG. 3 shows a main section of the first embodiment as luminous glass, the main section corresponding to the cross-section A-A' of FIG. 2.

With further reference now to FIGS. 2-3, thin film layer 3 comprises a matrix 33 of a thin film material and fine particles 4 dispersed in the matrix 33, and may be formed on at least a portion of a main surface 21 of glass sheet layer 2. In the embodiment shown by FIG. 1, thin film layer 3 covers all or substantially all of main surface 21 of glass sheet layer 2. In the embodiment, the thin film layer 3 may comprise (a) partial blank portion(s) that form(s) (a) figure(s) of logo. In other embodiments, thin film layer 3 may cover any portion or area of main surface 21 of glass sheet layer 2 consistent with the spirit and scope of this disclosure. In other embodiments, the thin film layer 3 may form a figure(s) of logo.

The thickness of thin film layer 3 is preferably about 1 to 10 micrometers, or more preferably about 2 to 6 micrometers. If the thickness of thin film layer 3 is less than about 1 micrometer, the amount of light 51 that is introduced into thin film layer 3 may be undesirably decreased. On the other hand, a thin film layer 3 that is greater than 10 micrometers in thickness may undesirably increase the cost of the glass window 1.

In an exemplary embodiment, the thin film material is a silicon oxide-based material and the matrix 33 is formed, for example, by wet coating, through applying and heating a coating solution obtained by subjecting an alkoxysilane to hydrolysis and polycondensation in a solvent. Conventional solvents such as discussed in U.S. Pat. Nos. 8,299,169, 8,216,670, and 8,246,848, and JP Pub. No. 2015-034281 may be used as exemplary coating solutions for obtaining the matrix 33. Other thin film materials consistent with this disclosure may also be used.

An introduction of the light 51 into the glass window 1 from the edge of the glass sheet layer 2 or an interlayer film layer 6 may be easier than introduction of the light 51 from the edge of the thin film layer 3. Therefore, it is preferable that the light source(s) 5 is/are positioned at the edge portion of the glass sheet layer 2 or the interlayer film layer 6. In the case that the thin film material of the thin film layer is made of the silicon oxide-based material and the glass sheet layer 2 is made of the soda-lime glass, the layer 2 (or both the layer 2 and the layer 6) may form an optical waveguide, because a refractive index of the layer 2 is higher than that of the layer 3. The light 51 basically travels within the waveguide reflecting at interfaces of the optical waveguide, but the light 51 may be partially introduced to the layer 3 because light 51 with a high incident angle at the interfaces may be enter into the layer 3. Thus, such a glass window 1 may have a good balance between luminous area and brightness.

The coating solution may further comprise fine particles 4. In an exemplary embodiment, the coating comprises indium tin oxide (ITO) fine particles 4 dispersed in a matrix 33 of silicon oxide-based material. In the same or other embodiments, fine particles 4 may be formed from, for example and without limitation, antimony tin oxide (ATO), titanium oxide, tungsten oxide, zirconium oxide, and/or diamond. These materials have a higher refractive index (in the visible spectrum) than that of the matrix 33. Therefore, light scatterings 41 are generated and result in luminance of the thin film layer 3. The thin film layer 3 may comprise not only the fine particles 4 such as ITO, ATO, titanium oxide, tungsten oxide, zirconium oxide, diamond and so on but, also a combination of such fine particles and dye.

The fine particles 4 may comprise or essentially consist of a colorant, by which the thin film layer 3 results in colored film. In the case that the fine particles 4 comprise or essentially consist of the colorant, the luminous of glass window 1 may become more vivid than without the colorant. The colorant not just scatters the light 51, but partially absorbs the light 51. For that reason, it is thought that a vivid luminosity can be achieved. As an example of the colorant, there can be mentioned an organic pigment such as Pigment Blu 15 (Copper Phthalocyanine), Pigment Yellow 150 (Nickel,5,5'-azobis-2,4,6(1H,3H,5H)-pyrimidinetrione complexes), Pigment Green 7, Pigment Green 36, Pigment Red 122, Pigment Red 254, Pigment Orange, quinacridone-based pink color pigment, or an inorganic pigment such as $((Fe,Mn),(Fe,Mn))_2O_4$ (for gray color), $CoAl_2O_4$, $(Co,Zn,Ni)_2TiO_4$ (for blue color), $Fe_2O_3$ (for brown color), FeOOH (for yellow color). The fine particles 4 may comprise at least one selected from a group consisting of ITO, ATO, titanium oxide, tungsten oxide, zirconium oxide, diamond, and the above pigments.

The fine particles 4 have a median particle size distribution ($D_{50}$) of preferably less than approximately 200 nm in an exemplary embodiment. For example, fine particles 4 having a $D_{50}$ less than approximately 200 nm scatter desirable wavelengths of visible light and prevent color shifts of the light 51 emitted by the light source 5. By thin film layer 3 having such a structure, fine particles 4 may scatter light 51 from light source 5 and generate light scatterings 41, resulting in luminance of the thin film layer 3. Further, the exemplary mean diameter of fine particles 4 may provide a haze below approximately 10% for the glass window 1 in the luminous state, as measured by International Organization for Standardization ("ISO") Standard 14782:1999 titled Plastics—Determination of haze for transparent materials.

The concentration of fine particles 4 in thin film layer 3 is preferably 0.1% to 50% by weight or more preferably 0.2% to 40% by weight. If the concentration of fine particles 4 is less than about 0.1% by weight, luminance may be undesirably low. On the other hand, if the concentration of fine particles 4 is more than about 50% by weight, the haze of the glass window 1 may be undesirably high in the non-luminous state.

Further, the luminous behavior may depend on the concentration of fine particles 4 and a distance from the light source 51. Near the light source 51, a bright luminous area 42 may be formed. Further, as the concentration of fine particles 4 increases above more than about, e.g., 15% by weight, much of the light 51 may fade out on shorter distances and the bright luminous area 42 of glass window 1 may decrease. On the other hand, as the concentration of fine particles 4 decreases below about, e.g., 10% by weight, much of light 51 may fade out on longer distances and the bright luminous area 42 of glass window 1 may become wider.

In the case that the luminosity generated from light scattering by the fine particles (such as ITO, ATO, titanium oxide, zirconium oxide, diamond and so on; that is, in the case that the colorant is not used), the concentration of fine particles 4 in thin film layer 3 is preferably 1% to 50% by weight or more preferably 2% to 40% by weight. If the concentration of fine particles 4 is less than about 1% by weight, luminance may be undesirably low. On the other hand, if the concentration of fine particles 4 is more than about 50% by weight, the haze of the glass window 1 may be undesirably high in the non-luminous state.

In the case that the fine particles 4 comprise or essentially consist of the organic pigment as the colorant, the concentration of the organic pigment in thin film layer 3 is preferably 0.05% to 10% by weight or more preferably 0.1% to 8% by weight. If the concentration of the organic pigment is less than about 0.05% by weight, luminance by the organic pigment may be undesirably low. On the other hand, if the concentration of the organic pigment is more than about 10% by weight, the visible transmittance of the glass window 1 may be undesirably low in the non-luminous state.

In the case that the fine particles 4 comprise or essentially consist of the inorganic pigment as the colorant, the concentration of the inorganic pigment, in thin film layer 3 is preferably 1% to 50% by weight or more preferably 2% to 40% by weight. If the concentration of the inorganic pigment is less than about 1% by weight, luminance by the inorganic pigment may be undesirably low. On the other hand, if the concentration of the colorant is more than about 50% by weight, the visible transmittance of the glass window 1 may be undesirably low in the non-luminous state.

With continuing reference to FIGS. 1 and 2, at least one light source 5 is positioned at the edge portion 32 of thin film layer 3 and/or at the edge portion 22 of glass sheet layer 2 for introducing light 51 into thin film layer 3. Light source 5 may be any device that can generate visible light. The visible light may be white light or colored light such as red, blue, green, yellow, orange, pink, purple and so on. For example and without limitation, light source 5 may be a light-emitting diode ("LED"), organic light-emitting diode ("OLED"), electroluminescent ("EL") film, LASER, or an optical fiber.

In the exemplary embodiment shown by FIGS. 1 and 2, light source 5 is arranged along edge portion 32 of thin film layer 3. In other embodiments, any number of light sources may be selected depending upon the design and requirements for a particular glass window. Further, light sources may be located and/or oriented on edge portions 32 and/or 22, and/or any other edge portions of the glass window 1, in any manner consistent with this disclosure. For example, multiple light sources may be arrayed along one or more edges, or all edges, of a glass window.

Figure 4:
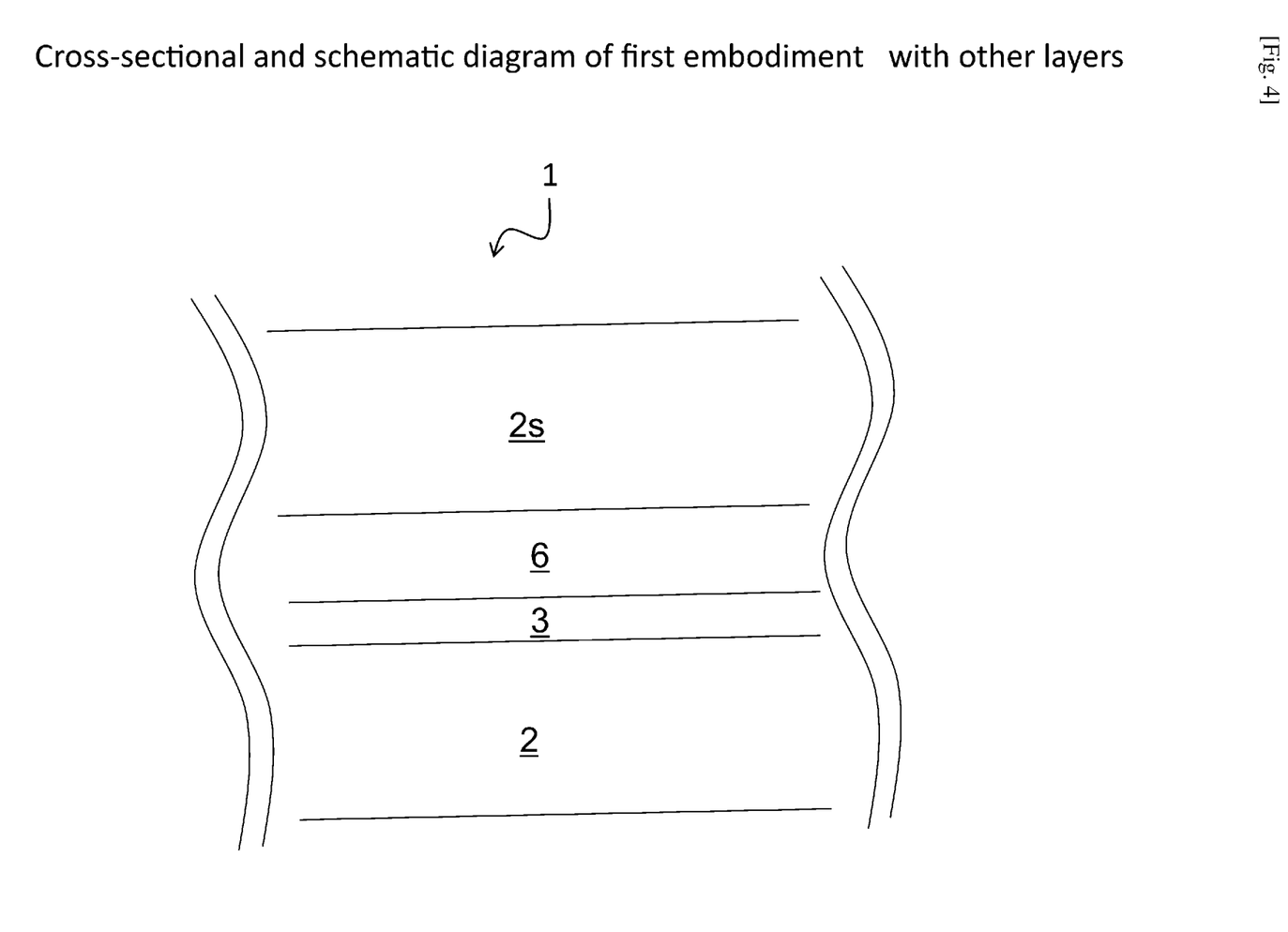
FIG. 4 shows a schematic and cross-sectional drawing of the first embodiment further incorporating an interlayer plastic film and a second glass sheet layer.

With reference now to FIG. 4, a schematic and cross-sectional drawing of glass window 1 of FIG. 1 is shown with additional, optional layers. In the exemplary embodiment of FIG. 4, glass window 1 further comprises a second glass sheet layer 2s and an interlayer plastic film layer 6. Second glass sheet layer 2s may be a glass sheet layer as previously described with respect to glass sheet layer 2. For example, second glass sheet layer may be a flat glass or a curved glass, provided that second glass sheet layer 2s and glass sheet layer 2 are compatible in glass window 1. Second glass sheet layer 2s may be a safety glass such as a tempered glass, and in an exemplary embodiment second glass sheet layer 2s is an inorganic glass sheet with high or low transparency, such as soda-lime glass produced by the float process or the roll-out process commonly employed in producing glass substrates for automobiles or architectural applications. Second glass sheet layer 2s may be either colorless (for example clear glass) or colored (for example green tint glass or privacy glass) and may be combined with other functional films (for example acoustic interlayers or colored interlayers). Further, second glass sheet layer 2s may be in any of various forms.

Plastic film layer 6 may be formed from, for example and without limitation, polyvinyl butyral resin ("PVB"), ethylene vinyl acetate resin ("EVA"), or polyurethane resin ("PU"). Plastic film 6 layer may be either colorless or colored (for example, having a dark gray hue) with high or low transparency. In the exemplary embodiment, plastic film layer 6 does not comprise fine particles which may scatter light and decrease luminance of thin film layer 3. In various other embodiments, optional interlayers may have different refractive properties depending upon the design and requirements for a particular glass window.

In the exemplary embodiment of FIG. 4, thin film layer 3 is adjacent to a main surface of second glass sheet layer 2s, and plastic film layer 6 is adjacent to main surface 21 of glass sheet layer 2. In other embodiments, the number and type of interlayers and the location of various layers within glass window 1 may vary depending upon the design and requirements for a particular glass window. In the exemplary embodiment, plastic film layer 6 is bonded to thin film layer 3 and main surface 21 of glass sheet layer 2, for example, by known lamination processes.

Further, in the exemplary embodiment shown by FIG. 4 and other embodiments, light source 5 may be positioned at the edge portion (not shown in FIG. 4) of thin film layer 3 and/or at an edge portion (not shown in FIG. 4) of glass sheet layer 2 and/or second glass sheet layer 2s. In embodiments comprising more than one interlayer, for example two plastic film layers, light source 5 may also be positioned between two interlayers.

Figure 5:
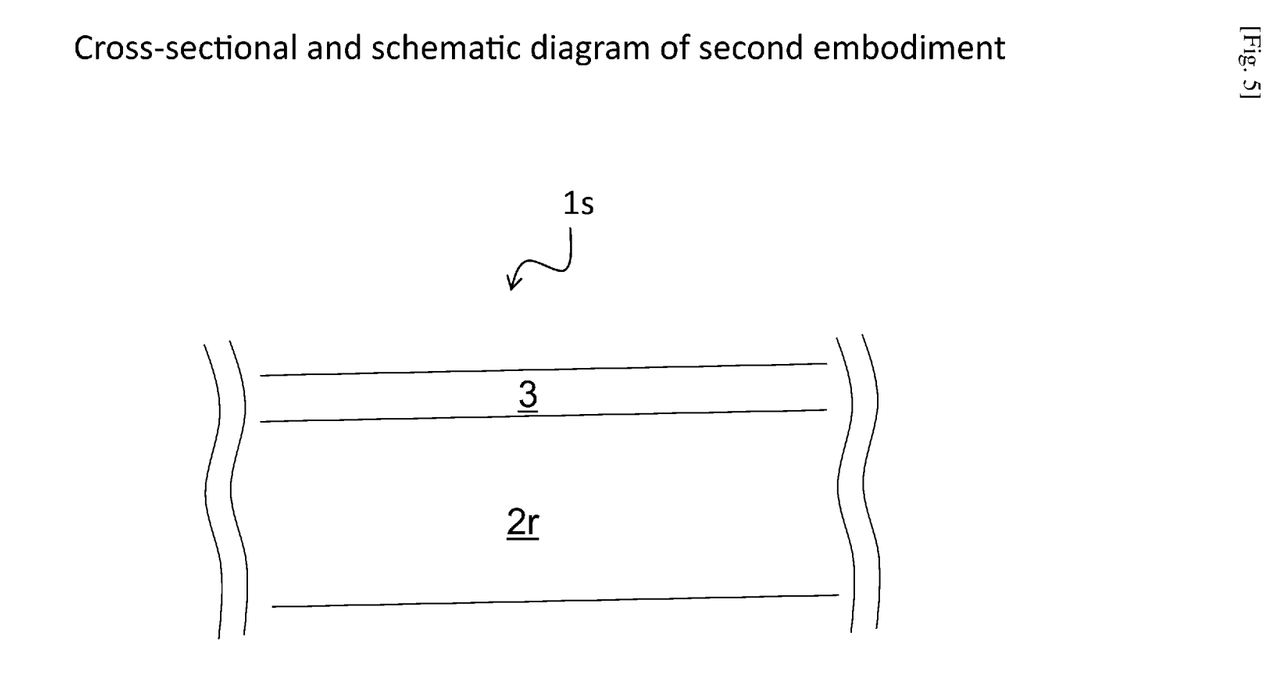
FIG. 5 shows a cross-sectional and schematic diagram of second embodiment of a glass window having a luminous capability.

With reference now to FIG. 5, a cross-sectional and schematic diagram of another exemplary embodiment of a glass window is having luminous capability is shown. The embodiment of FIG. 5 comprises a resinous sheet layer 2r and a thin film layer 3, a glass sheet layer 2, at least one interlayer plastic film layer 6, and at least one light source 5 (not shown in FIG. 5), as previously described, positioned at an edge portion (not shown in FIG. 5) of thin film layer 3 and/or resinous sheet layer 2r. In embodiments comprising one or more interlayers, at least one light source 5 may additionally be positioned between two interlayers. Resinous sheet layer 2r may be formed from, for example and without limitation, polyethylene terephthalate resin, polycarbonate resin, polyvinyl chloride resin, polyethylene resin, or other known resinous materials consistent with this disclosure.

In the exemplary embodiment of FIG. 5, thin film layer 3 is stacked on a main surface of resinous sheet layer 2r. Plastic film layer 6 is bonded to thin film layer 3 and main surface 21 of glass sheet layer 2 using known lamination processes.

The glass window disclosed is used for not only automobiles but also for architectural applications. Although certain example embodiments have been described above, the present disclosure is not limited thereto. Also, the features, aspects, advantages, and example embodiments described herein may be combined to realize yet further embodiments.

Further, the current disclosure covers various modifications and equivalent arrangements included within the spirit and scope of the appended claims.

EXAMPLE

Examples will be discussed hereinafter.

Example 1

<Preparation of Coating Solution>

Tetraethoxysilane (Si(OC$_2$H$_5$)$_4$, referred to as TEOS) and methyltriethoxysilane (CH$_3$Si(OC$_2$H$_5$)$_3$, referred to as MTES) were used as raw material of silicon oxide. A sol solution was prepared by mixing 26.05 g of TEOS, 8.68 g of MTES, 25.25 g of propylene glycol monoethyl ether and 16.91 g of 0.5 N acetic acid with stirring at 40° C. for 15 hours. In the sol solution, a ratio between a solid content made from the tetraalkoxysilane and that made from the trialkoxysilane was 70:30 on a weight percentage basis.

ITO ultrafine particles having an average particle size of 50 nm were used as the fine particles. 23.10 g of a dispersion liquid of the ultrafine particles (ITO ultrafine particles concentration: 30 wt %, solvent: isopropyl alcohol, available from Mitsubishi Materials Corporation) was mixed into the sol solution obtained in a coating solution. In the treating agent, a ratio between the ITO ultrafine particles and a total of the solid contents made from the tetraalkoxysilane and the trialkoxysilane was 30:70 on a weight percentage basis.

<Preparation of Glass Sample>

As a glass sheet layer 2, conventional clear soda-lime glass manufactured by a float process in the form of a 300 mm×300 mm×3 mm (thickness) flat plate was prepared. A surface of the glass was polished with a polishing liquid, rinsed in water and then dried, in which the used polishing liquid was a 2 wt % ceria slurry obtained by mixing a glass polishing agent MIREK E40 (T) (available from MITSUI MINING & SMELTING CO., LTD.) into water.

A cotton cloth (available under the trade name of BEM-COT) was impregnated with the coating solution. Then, the rinsed surface of the glass was wiped with the cotton cloth thereby applying the coating solution to the surface of the glass. Thereafter, a heat treatment was carried out for 10 minutes so that the substrate had a temperature of 200° C., thereby obtaining a glass sample comprising a glass sheet layer 2 and a thin film layer 3. A thickness of the thin film layer 3 of the glass sample was 1.4 μm.

<Method for Evaluating Sample>

Figure 6:
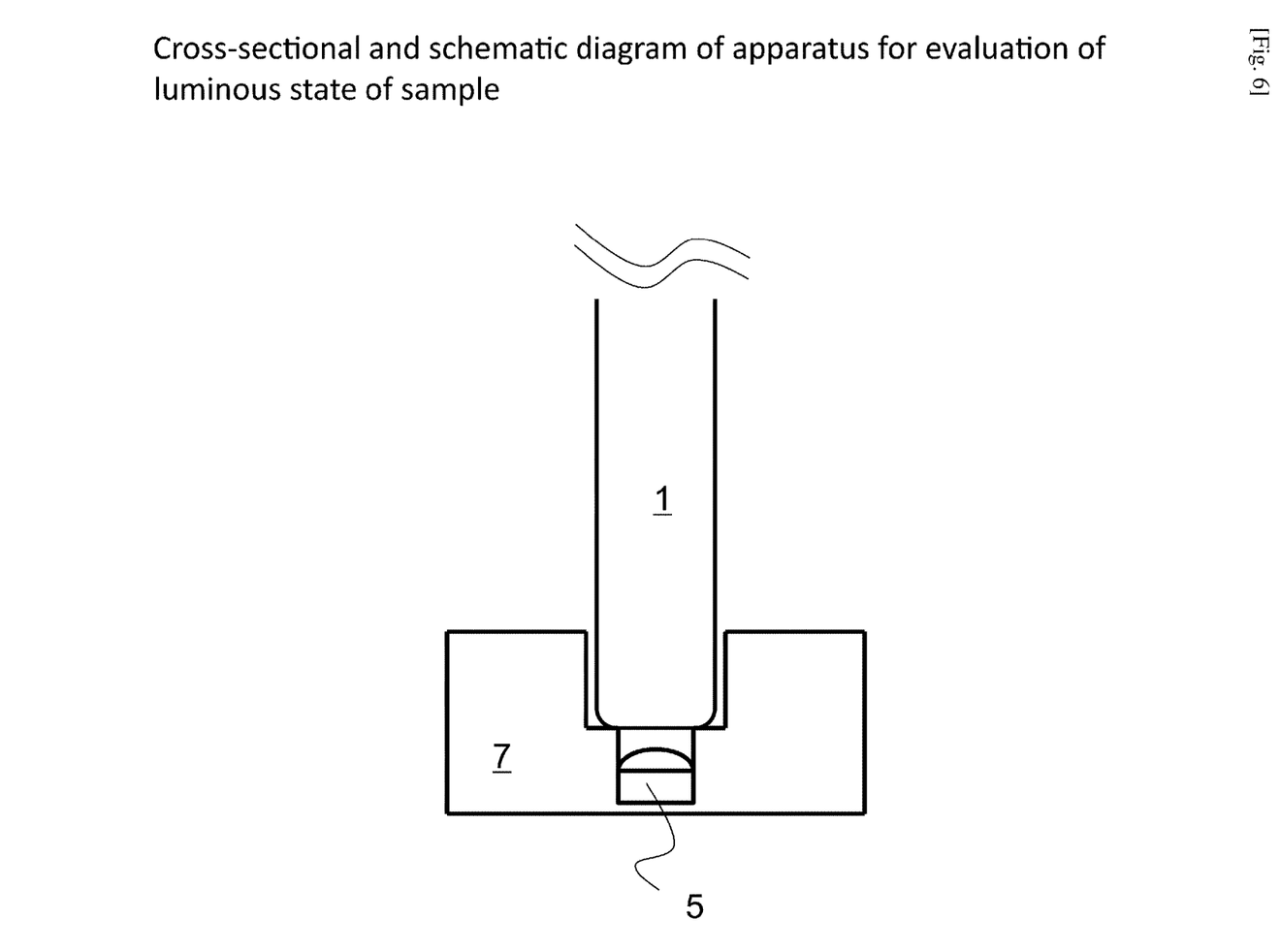
FIG. 6 shows a cross-sectional and schematic diagram of apparatus for evaluation of a luminous status of a sample.
Figure 7:
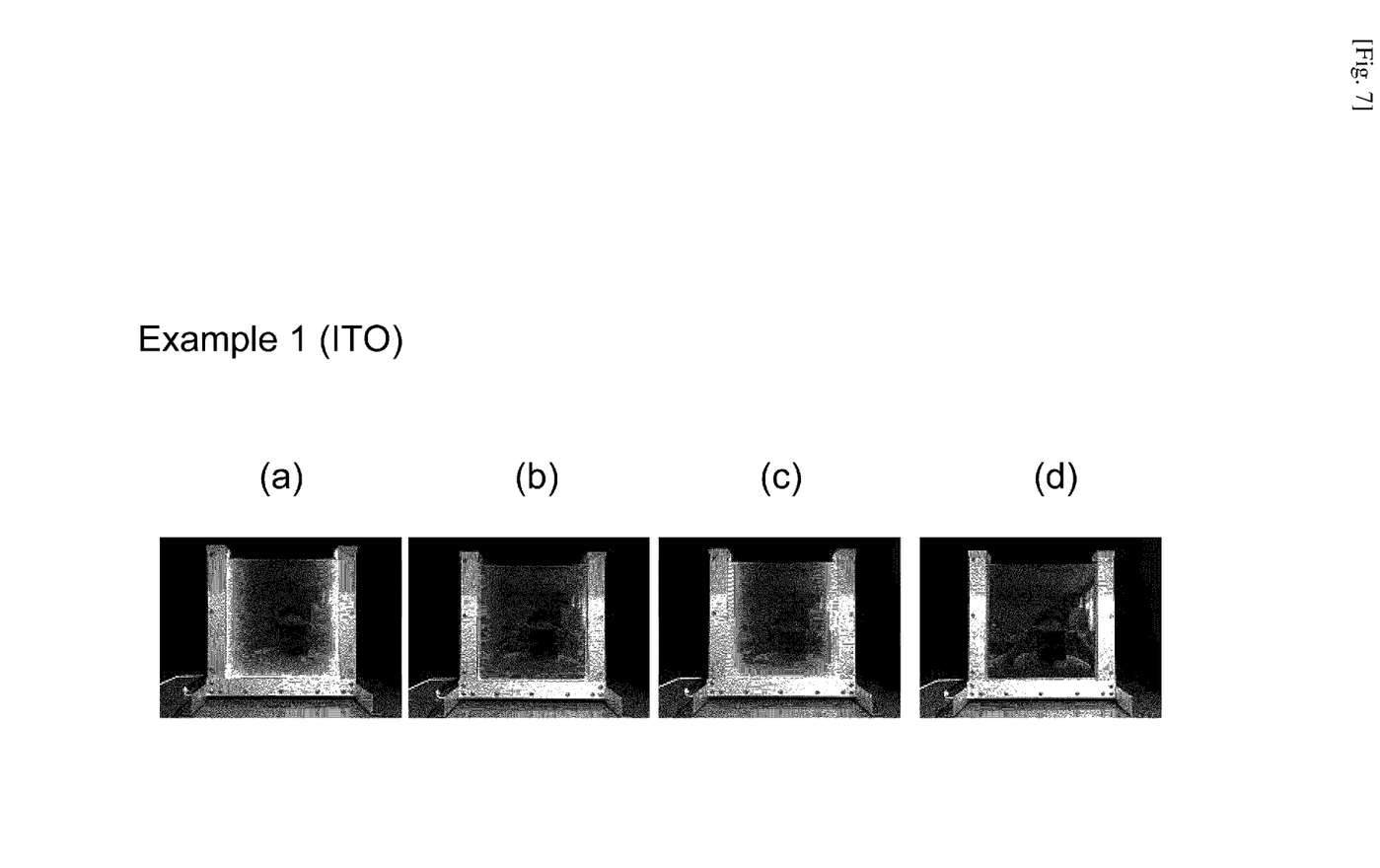
FIGS. 7(a)-7(d) show photographs of the glass window in a luminous state in example 1.
Figure 8:
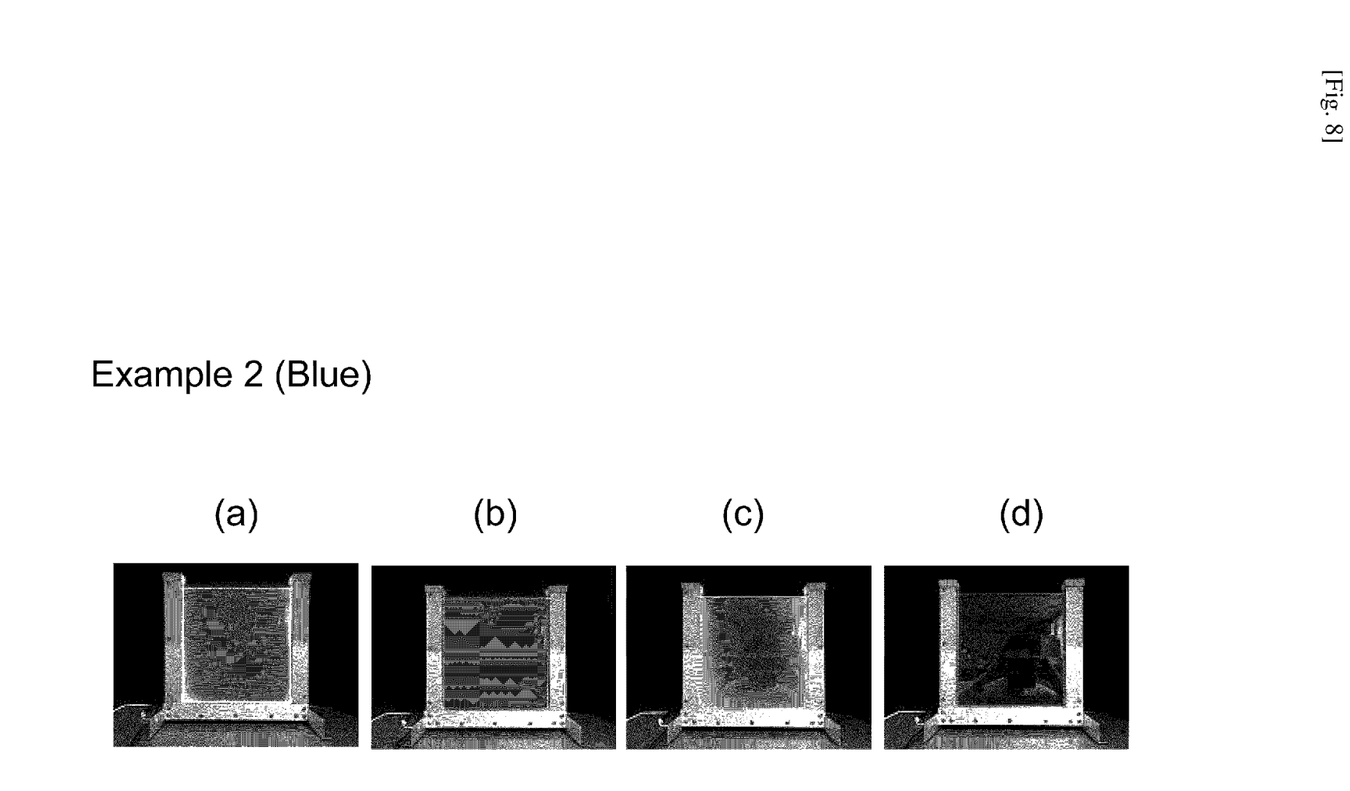
FIGS. 8(a)-8(d) show photographs of the glass window in a luminous state in example 2.
Figure 9:
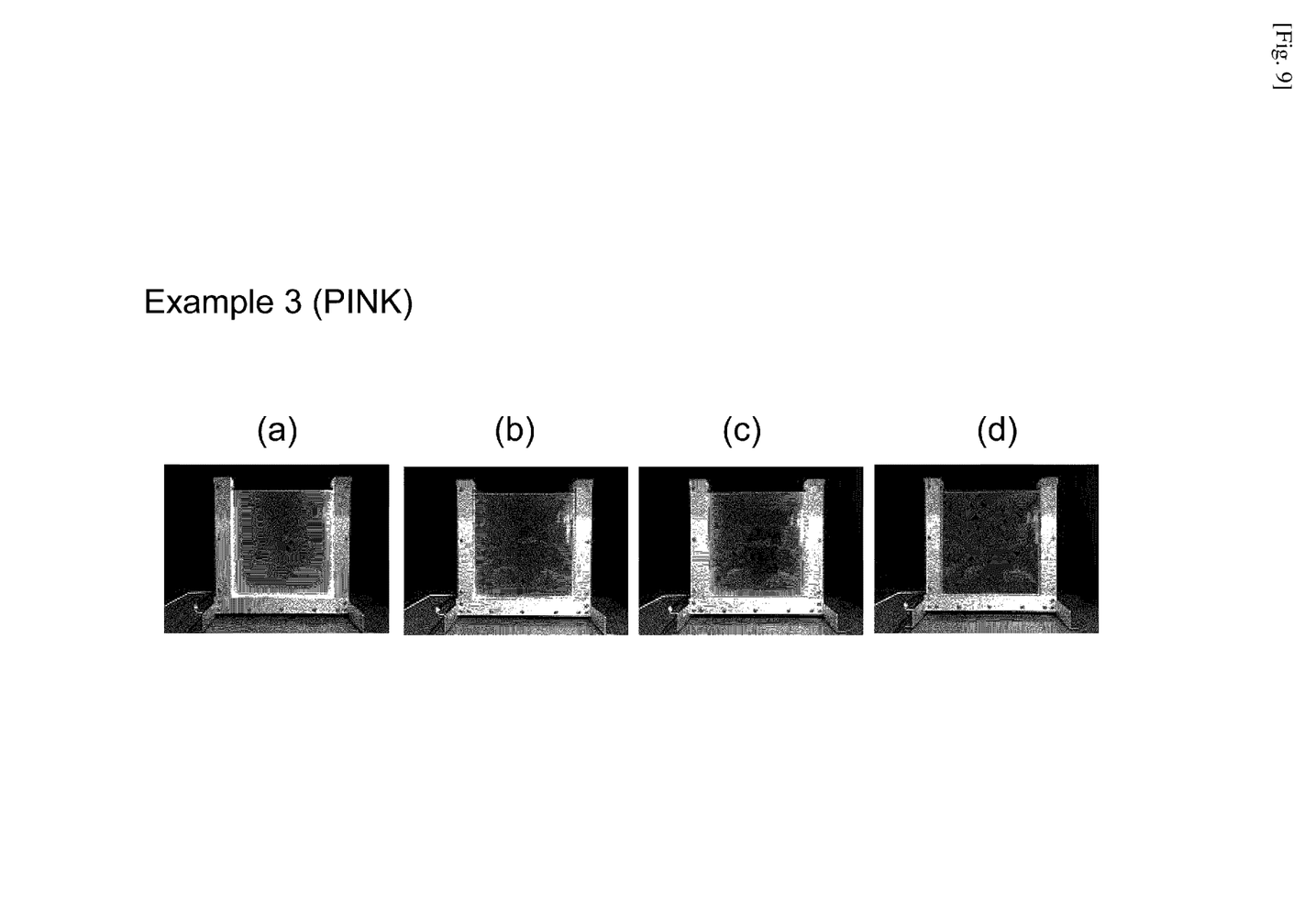
FIGS. 9(a)-9(d) show photographs of the glass window in a luminous state in example 3.
Figure 10:
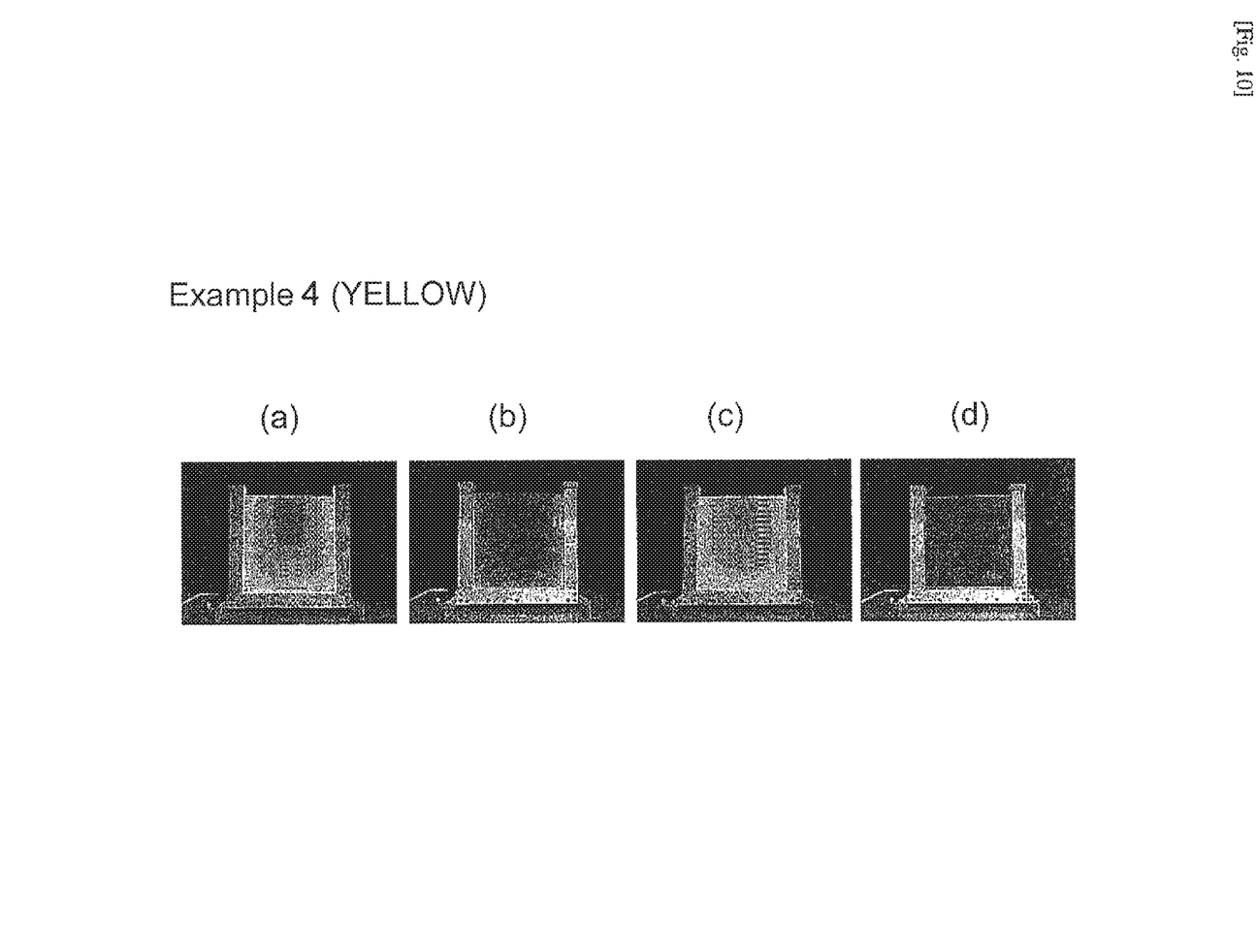
FIGS. 10(a)-10(d) show photographs of the glass window in a luminous state in example 4.

The prepared sample was inserted to frame 7 embedded multiple LEDs in the longitudinal direction as shown in FIG. 6, resulting in the glass window 1. The frame 7 covered three edges of the sample. LEDs which can generate white, blue, green and red lights were selected. The light emitted from the LEDs was inserted in the samples from three edges of the glass sheet layer 2. A luminous state of each glass window 1 was observed. Photographs of the glass window 1 in a luminous state are shown in FIGS. 7(a)-7(d). As shown in FIGS. 7(a)-7(d), the luminosity of a peripheral portion of the glass window 1 was observed.

Example 2

The procedure of example 1 was repeated, with the exception that Pigment Blue 15 was used as the fine particle 4 instead of ITO and, in the treating agent, a ratio between the Pigment Blue 15 and a total of the solid contents made from the tetraalkoxysilane and the trialkoxysilane was 0.4:99.6 on a weight percentage basis.

Photographs of the glass window 1 in a luminous state are shown in FIGS. 8(a)-8(d). As shown in FIGS. 8(a)-8(d), the luminous of a peripheral portion of the glass window 1 was observed. The luminosity was more vivid than the example 1, especially in the case of blue and green light 51.

Example 3

The procedure of example 1 was repeated, with the exception that quinacridone-based pink color pigment was used as the fine particle 4 instead of ITO and, in the treating agent, a ratio between the Pigment Blue 15 and a total of the solid contents made from the tetraalkoxysilane and the trialkoxysilane was 0.8:99.2 on a weight percentage basis.

Photographs of the glass window 1 in a luminous state are shown in FIGS. 9(a)-9(d). As shown in FIGS. 9(a)-9(d), the luminosity of a peripheral portion of the glass window 1 was observed. The luminosity was more vivid than the example 1, especially in the case of white and red light 51.

Example 4 (Yellow)

The procedure of example 1 was repeated, with the exception that Pigment Yellow 150 was used as the fine particle 4 instead of ITO and, in the treating agent, a ratio between the Pigment Blue 15 and a total of the solid contents made from the tetraalkoxysilane and the trialkoxysilane was 1.5:98.5 on a weight percentage basis.

Photographs of the glass window 1 in a luminous state are shown in FIGS. 10(a)-10(d). As shown in FIGS. 10(a)-10(d), the luminosity of a peripheral portion of the glass window 1 was observed. The luminosity was more vivid than example 1, especially in the case of white and green light 51.

The invention claimed is:

1. A glass window having a luminous capability, comprising:
   a first glass sheet layer formed of a soda-lime glass;
   a thin film layer having fine particles dispersed in a matrix of a thin film material formed of a silicon oxide-based material; and
   a light source positioned at an edge portion of at least one of the thin film layer and the glass sheet layer,
   wherein the thin film layer covers all or substantially all of a main surface of the first glass sheet layer,
   wherein, in a non-luminous state, a haze of the glass window is below approximately 10% as measured by International Organization for Standardization Standard 14782:1999,
   wherein a thickness of the thin film layer (3) is 1 to 10 micrometers.

2. The glass window having a luminous capability of claim 1, wherein the fine particles have a higher refractive index than the matrix.

3. The glass window having a luminous capability of claim 1, wherein the fine particles scatter visible light from the light source, and, in a luminous state, a light intensity fades out from an edge portion of the glass window towards a center portion of the glass window.

4. The glass window having a luminous capability of claim 1, wherein a concentration of the fine particles in the thin film layer is 1% to 50% by weight.

5. The glass window having a luminous capability of claim 1, wherein the fine particles are composed of at least one selected from the group consisting of indium tin oxide (ITO), antimony tin oxide (ATO), titanium oxide, tungsten oxide, zirconium oxide, and diamond.

6. The glass window having a luminous capability of claim 1, wherein the fine particles have a mean diameter less than about 200 nm in $D_{50}$.

7. The glass window having a luminous capability of claim 1, further comprising:
a second glass sheet layer,
wherein the thin film layer covers at least a portion of at least one of the main surfaces of the first glass sheet layer and a main surface of the second glass sheet layer, and
wherein the light source is positioned at one or more of (i) an edge portion of the thin film layer, (ii) an edge portion of the first glass sheet layer, (iii) an edge portion of the second glass sheet layer, and (iv) a position between the first glass sheet layer and the second glass sheet layer.

8. The glass window having a luminous capability of claim 1,
wherein the thin film layer is a colored film, and
wherein the fine particles comprise a colorant.

9. A method for manufacturing a glass window having a luminous capability, wherein, in a non-luminous state, a haze of the glass window is below approximately 10% as measured by International Organization for Standardization Standard 14782:1999, the method comprising:
providing a glass sheet layer formed of a soda-lime glass;
coating all or substantially all of a main surface of the glass sheet layer with a thin film layer having fine particles dispersed in a matrix of a thin film material formed of a silicon oxide-based material, a thickness of the thin film layer being 1 to 10 micrometers; and
positioning at least one light source at one or more of (i) an edge portion of the glass sheet layer, and (ii) an edge portion of the thin film layer.

10. The method of manufacturing a glass window having a luminous capability of claim 9, wherein the coating step comprises a wet coating process.

11. The method of manufacturing a glass window having a luminous capability of claim 10, further comprising providing a second glass sheet layer, and bonding an interlayer between the thin film layer and the second glass sheet layer.

12. The method of manufacturing a glass window having a luminous capability of claim 11, further comprising
providing a resinous sheet layer, and
bonding an interlayer between the thin film layer and the resinous sheet layer.

* * * * *